US006871286B1

(12) United States Patent
Cagle et al.

(10) Patent No.: US 6,871,286 B1
(45) Date of Patent: Mar. 22, 2005

(54) METHOD AND APPARATUS FOR RESETTING PASSWORDS IN A COMPUTER SYSTEM

(75) Inventors: John M. Cagle, Houston, TX (US); Gregory T. Noren, The Woodlands, TX (US); Kevin M Jones, Tomball, TX (US); Christopher J. Frantz, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/363,508

(22) Filed: Jul. 29, 1999

(51) Int. Cl.[7] .................................................. H04L 9/32
(52) U.S. Cl. ........................ 713/202; 709/229; 709/225
(58) Field of Search .............................. 713/202, 201; 709/229, 225, 226

(56) References Cited

U.S. PATENT DOCUMENTS 5,276,863 A * 1/1994 Heider ....................... 709/222
5,748,896 A * 5/1998 Daly et al. ................. 709/223
5,991,882 A * 11/1999 O'Connell .................. 713/201

FOREIGN PATENT DOCUMENTS

GB     2281991 A  *  3/1995  ............. G06F/1/00

OTHER PUBLICATIONS

Newton, Newton's Telecom Dictionary, Telecom Books, 14 edition, p. 842.*

* cited by examiner

*Primary Examiner*—Kim Vu
*Assistant Examiner*—Paula Klimach

(57) ABSTRACT

A method for resetting a password in a computer system is provided. A remote reset signal is received. A local reset verification signal is received at the computer system. An elapsed period of time between receipt of the remote reset signal and the local reset verification signal is determined. The password is reset in response to the elapsed period of time being less than a predetermined time period.

25 Claims, 3 Drawing Sheets

METHOD AND APPARATUS FOR RESETTING PASSWORDS IN A COMPUTER SYSTEM

BACKGROUND OF THE INVENTION

1. Field of the Invention

This invention relates generally to computer systems, and, more particularly, to a method and apparatus for resetting passwords in a computer system.

2. Description of the Related Art

A computer network is a connection of points (e.g., a plurality of computers) that have been interconnected by a series of communication paths. Moreover, any number of individual computer networks may be interconnected with other computer networks, which may increase the complexity of the overall system. Generally, computer networks may be used to increase the productivity of those computers that are connected to the network. For example, a computer connected to a network may communicate with other computers that are also connected to the network. Furthermore, the computer network may be used to share data, peripherals, or any other resources that are made available on the network.

The interconnection of the various points on the computer network may be accomplished using a variety of known topologies. For example, the most common computer network topologies include the bus, star, and ring configurations. Furthermore, communication between the computers connected to the network may be accomplished using a variety of known protocols. For example, the connected computers may communicate using TCP/IP, SNA, and APPN.

Generally, a host computer (e.g., server) may function as a centralized point on the network. For example, using any of the network topologies discussed above, a plurality of client computers may be interconnected such that the server controls the movement of data across the network. The host computer may have an operating system that may be used to execute a server application program that is adapted to support multiple clients. Typically, the server may service requests from a plurality of client computers that are connected to the network. Furthermore, the server may be used to administer the network. For example, the server may be used to update user profiles, establish user permissions, and allocate space on the server for a plurality of clients connected to the network.

In many computer networks, a large amount of data may be stored on the server and accessed by the attached client computers. For example, each client computer may be assigned a variable amount of storage space on the server. The assigned storage spaces may be private (i.e., protected) or made available to other clients, and the assigned storage spaces may be used to store a variety of file types, such as documents, email messages, etc. Furthermore, the server may be used to save public data (i.e., data that does not necessarily have a specific owner but may be accessed by any number of clients.) For example, public folders (i.e., directories) may be created on the server, and the public folders may store data that relates to group projects, company information, or any other data that may require access from more than one client.

The administration of a server is often a complex task that requires a great deal of software and hardware knowledge on the part of the administrator. Certain businesses may desire the functional advantages offered by a server, but may lack the expertise to effectively administer the server. Although computer consultants may be capable of providing the expertise, they tend to be costly. One of the functions often performed by a server administrator is password control. Password are used by various users of the computer network, including the administrator, to control access to various files or functions. For example, based on a user's login name and password they may be allowed to access features such as internet access, e-mail, file sharing, administrative control, etc.

Because the degree to which a user can access the functions of the server and/or clients on the network depends on their individual user profile, it is important to maintain password integrity. The password controls access to the user profile, and thus the permissions granted to a user in the network. It is generally not advisable to write down passwords to maintain security, and thus, it is not uncommon for a user to forget his/her password, preventing access to the network until the password is reinitialized by the administrator. A special problem exists when the password allowing access to the administrative functions of the server is misplaced or forgotten. Without the administrative password, no user would have access to the core functions of the server.

One technique for restoring the user password involves reinstalling the software operating the server. Such a technique is time-consuming and may result in a loss of data or custom configuration information. Another technique involves a special password reset button on the server, that when pressed, initiates a software routine to restore the server. This solution requires that custom hardware be provided on the server, increasing its cost and reducing its flexibility (i.e., from the standpoint of the server manufacturer).

The present invention is directed to overcoming, or at least reducing the effects of, one or more of the problems set forth above.

SUMMARY OF THE INVENTION

One aspect of the present invention is seen in a method for resetting a password in a computer system. A remote reset signal is received. A local reset verification signal is received at the computer system. An elapsed period of time between receipt of the remote reset signal and the local reset verification signal is determined. The password is reset in response to the elapsed period of time being less than a predetermined time period.

BRIEF DESCRIPTION OF THE DRAWINGS

The invention may be understood by reference to the following description taken in conjunction with the accompanying drawings, in which like reference numerals identify like elements, and in which.

Figure 1:
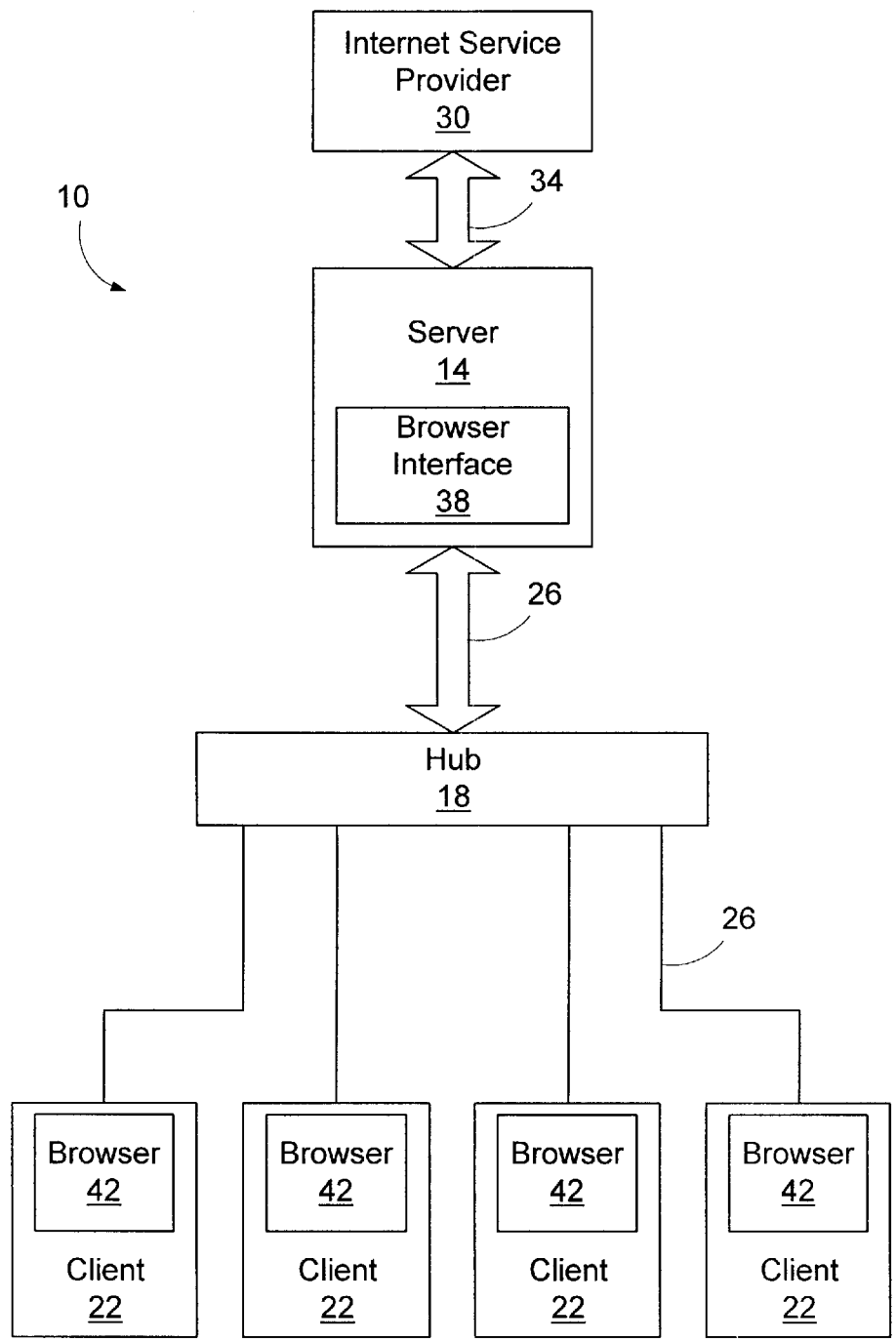
FIG. 1 is a simplified block diagram of a computer network in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a block diagram of a computer network 10 is shown. The computer network 10 may be configured using a variety of known topologies. For example, the computer network 10 may be configured as a ring, bus, or any other known method of interconnecting computers. In one embodiment, the computer network 10 is configured using a star topology and comprises a server 14, a hub 18, and a plurality of clients 22 that are coupled to the hub 18. It is contemplated that the hub 18 may comprise of a variety of switching or routing devices depending upon the particular application.

The hub 18 may be used as an intermediary between the server 14 and the clients 22. Generally, the hub 18 directs the flow of data between the server 14 and the clients 22. For example, each client 22 attached to the hub 18 may be identified by a unique address. Accordingly, based on the unique address, data may be routed from the server 14 to the appropriate client 22 through the hub 18. Furthermore, the hub 18 may control the flow of data from the clients 22 to the server 14 (i.e., the hub 18 may be a bi-directional device.) Moreover, the hub 18 may operate in conjunction with the server to transfer data between two clients 22.

Although only one hub 18 is shown in FIG. 1, it is contemplated that a plurality of hubs 18 may be included in the computer network 10, which may increase the number of clients 22 that may be attached to the network 10. For example, in one embodiment, each hub 18 may be coupled to seven clients 22. Once a hub 18 is at maximum capacity, an additional hub 18 may be attached to the filled hub 18 and seven additional clients 22 may be attached to the empty hub 18. It is contemplated that the network 10 may be designed to service any number of clients 22, and in one embodiment, three hubs 18 may be stacked, as described above, and the server 14 may be connected to twenty-five clients 22.

It is contemplated that a variety of protocols may be used to control the flow of data between the server 14 and the clients 22. For example, the server 14 and the clients 22 may transfer data using TCP/IP, SNA, APPN, or any other protocol adapted to facilitate the movement of data. In one embodiment, transferring data between the server 14 and the clients 22 requires client software operating on the clients 22 and server software operating on the server 14. The client software and the server software cooperate to transfer and receive data. For example, the sender (e.g., client 22 or server 14) may encapsulate data into a packet. The packet may include any additional information (e.g., addresses, etc.) that may be necessary to successfully transmit the packet across the network 10 to a receiver (e.g., client 22 or server 14.) The receiver may decapsulate the packet removing any undesired information. Once decapsulated, the data contained in the packet may be processed.

The clients 22 may be personal computers (PCs). For example, the clients 22 may be IBM compatible PCs or Macintosh® computers. Moreover, each client 22 may include a network interface card (not shown) that provides the necessary hardware for data to be transferred to the network 10. In addition to the client software, each client 22 may include an operating system, such as Windows® 95/98, Windows® NT, MAC OS7/8, etc.

The server 14 may be connected to the hub 18 using a network interface card (not shown.) As with any connection in the network 10, network interface cables 26 may be used to interconnect devices on the network 10. For example, the electrical connection between the server 14 and the hub 18 may be established using coaxial cable, twisted pair cable, fiber optic cable, or any other material conducive to carrying a signal. In addition, it is contemplated that the server 14 may be connected to an internet service provider (ISP) 30 using a variety of hardware configurations, such as ISDN, TI, etc. In one embodiment, the server 14 may be connected to the internet service provider 30 using a modem (not shown) and a connection to a local telephone line 34.

In one embodiment, the server 14 may be "headless" requiring remote service and administration. For example, the server 14 may be placed in the network 10 without being connected to a keyboard, monitor, mouse, or any other user input/output devices. Such a headless configuration is ideally suited for use in a setting where the server 14 is treated more as an information appliance to enhance the network, rather than the central core of the network 10. For example, a small business using a simple peer-to-peer network 10 arrangement may wish to have additional services, such as e-mail, centralized Internet access, common file storage and backup, file sharing, etc. Rather than using a more powerful, but more complicated, full-function server, the headless server 14 may be employed to provide the desired functionality without the overhead associated with the full-function server. Users of the headless server 14 may be less sophisticated computer users, and may desire an easily administered interface.

To service or administer the server 14, the server 14 may include a browser interface 38. For example, the server 14 may be accessed by any of the attached clients 22 using a browser 42, such as Microsoft Internet Explorer, Netscape Navigator, etc. The server 14 may be hard coded with a default IP address prior to being shipped to an end user. For example, the IP address 192.168.1.1 is a default dead net address from the Internet Assigned Numbers Authority (IANA) and may be used as an initial IP address. Once the network 10 is connected, the browser 42 that has been installed on the clients 22 may be pointed to the default IP address that has been designated in the server 14. Using the browser 42, the clients 22 may access a simple to use browser interface 38 that has been preloaded in the server containing a list of options for the server 14. The browser interface 38 may include a simple to use graphical user interface allowing the client 22 to easily access and customize the configuration of the server 14.

In one embodiment, to simplify configuring the initial setup of the clients 22 (e.g., configuring the browsers 42 to access the browser interface 38), a companion disk containing configuration software may be shipped with the server 14. The configuration software may be installed on the clients 22 simplifying the configuration of the individual browsers 42. Alternatively, it is contemplated that a network application program, such as TCP/IP, may be pre-installed on the clients 22 and the browsers 42 may be manually configured.

Figure 2:
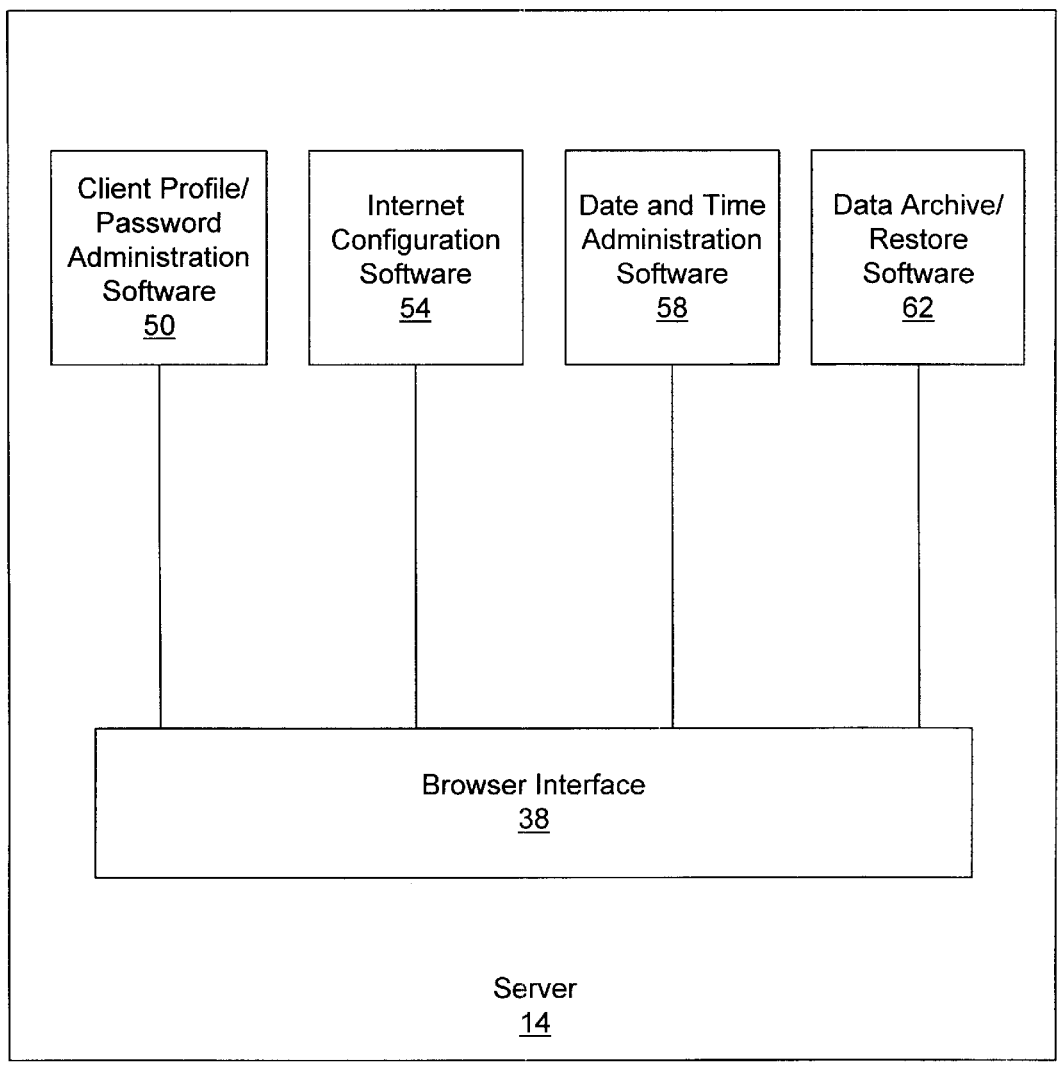
FIG. 2 is a diagram illustrating software applications executed by a server in the computer network of FIG. 1.

Referring to FIG. 2, a block diagram illustrating examples of various administration features that may be accessed using the browser interface 28 of the server 14 is provided. As described above, the browser interface 38 may be used in conjunction with the browsers 42 of the clients 22 to simplify the administration, configuration, and customization of the server 14. It is contemplated that, depending upon the particular application, additional features may be added and administrated using the browser interface 38 described above. In one embodiment, the browser interface 38 installed on the server 14 may includes client profile and password administration software 50, internet configuration software 54, date and time administration software 58, and data archiving and restoration software 62.

As illustrated above, the server 14 may be interconnected with the clients 22 in the network 10. Before the clients 22 may access resources available on the server 14, each user is identified by a user profile that may be protected with a user password. It is contemplated that the first client 22 connected to the network 10 may access the server 14 via its browser 42 and the browser interface 38 using an administration profile and password provided by the manufacturer. Once the administrator has accessed the server 14, the administration profile and password may be changed, and the other users may be assigned user profiles and passwords. User profiles and passwords may be added, deleted, and changed as often as desired. Moreover, any user that has accessed the server 14 using the administration profile and password may have access to the administration features of the software 50, 54, 58, and 62 on the server 14.

As illustrated above, the server 14 may be connected to the internet service provider 30. Using the browser interface 38 and the administration profile and password, any client 22 may access and configure the server 14 with the appropriate internet settings. For example, the internet service provider account information may be designated in the server 14, e-mail server addresses may be initialized, and internet permissions assigned. Depending upon the desired internet usage, individual users may be granted internet access while other users connected to the network may be denied internet access.

The date and time administration software 58 allows a user to access the current date, time, and time zone set for the server 14 by the manufacturer, since the default information for these items is many times incorrect for the particular user. The browser interface 38 in conjunction with the administrator profile and password allows the information to be updated reflecting the locale of the user.

The data archiving and restoration software 62 may be used to backup data stored on the primary and expansion storage devices (not shown). Using the browser interface 38, a data archive schedule may be configured to automatically archive the data saved on the primary and expansion storage devices (not shown) onto a backup storage device (not shown). For example, the administrator may configure the settings of the server 14 to select an automated backup routine.

Because the server 14 in the illustrated embodiment is configured in a headless configuration, there is no central administration point. Rather, the administrator accesses the administrative functions through browser 42 on one of the clients 22 to the browser interface 38 on the server 14. If one of the users forgets his/her password, the administrator may access the configuration files through the browser 42 and reset the password. A unique problem arises when it is the administrator that forgets the administrative password. Because there is no local interface to the server 14, the administrator cannot access the configuration files. Restoring the factory fresh operating system on the server 14 requires knowledge of the administrator password, so a technique for resetting the administrator password is provided. Although the technique is described as it may be implemented for resetting the administrator password, it may also be applied to resetting other passwords on the system. For example, the administrator may be absent from the office, and a particular users needs a password reset. The technique may also be applied to such a case.

Figure 3:
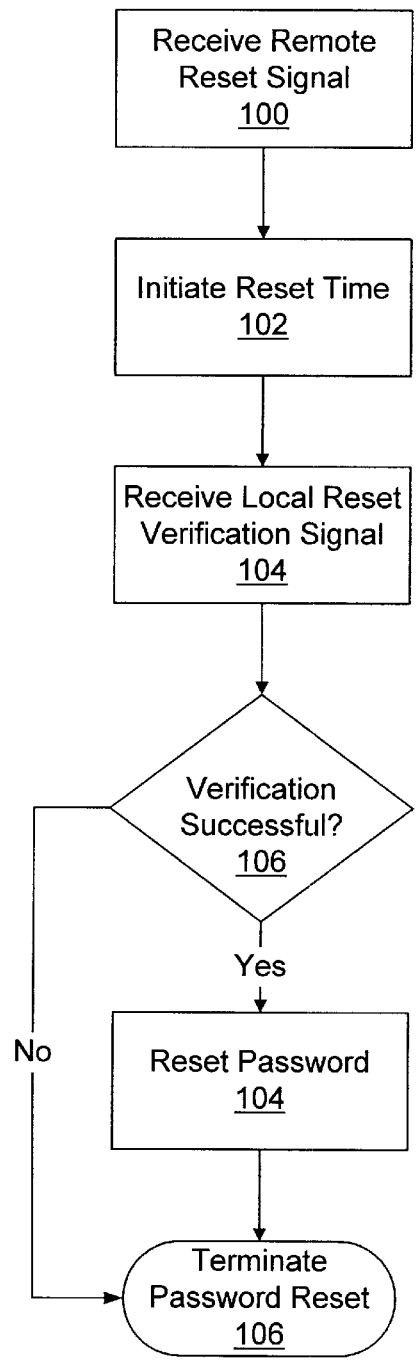
FIG. 3 is a flow diagram illustrating a method for resetting a password in accordance with the present invention.

Turning now to FIG. 3, a flow diagram of a method for resetting a password is provided. A remote reset signal is received in block 100. The remote reset signal may comprise a signal from a user initiated at one of the clients 22. For example, if a user attempts to login as the administrator a predetermined number of times (e.g., 3) and fails, the browser 42 may access a document (e.g., an HTML document, Java applet, etc.) having a reset password "push button" encoded with instructions that send a signal to the server 14 when activated. Alternatively, a remote reset signal may be received by the server 14 through the connection to the internet service provider 30. A user may contact a central office, for example, the company that manufactured the server 14, and a message could be sent to the server 14 from the central office. Still another example may be that a user sends an e-mail message to the administrator from one of the clients 22 including the text "reset [user] password", where "[user]" could be the administrator or another user.

In response to receiving the remote reset signal, the client profile and password administration software 50 initiates a reset time in block 102. For example, the time that the remote reset signal was received could be stored in a particular text file (e.g., ResetRequest.txt) on the server 14. The reset time is provided to track the time between the receipt of the remote reset signal and a local reset verification signal, which is received in block 104. Again, the local reset verification signal may take on a variety of forms. For example, the local reset verification signal may be the physical resetting of the server 14. When the server 14 reboots, the client profile and password administration software 50, realizing that a reset request had been received (e.g., by the presence of the ResetRequest.txt file) may determine the time elapsed between the remote reset signal and the local reset verification signal. The local reset verification signal may also be the activation of a push button on the server 14. The premise is that if a user has physical access to the server 14 and provides the local reset verification signal within a predetermined period of time, then that user most likely has the requisite authority to reset the password. The predetermined period of time depends on the specific application and on factors such as the proximity of the clients 22 to the server 14, for example. The time period may be 1 minute, 5 minutes, 10 minutes, or may be configured by the administrator during the initial setup of the server 14.

If the verification is successful in block 106 (i.e., the reset verification signal is received within the predetermined period of time), the password is reset in block 104 and the reset request is terminated in block 106 (e.g., by deleting the ResetRequest.txt file). Otherwise, the reset request is terminated in block 106 without resetting the password. If desired, each reset request, whether successful or not may be logged by the client profile and password administration software 50 to identify potential security problems, such as a user repeatedly trying to reset the password to compromise the server 14.

The technique described herein for resetting a password, although not foolproof, provides a reasonable level of security and provides some measures to prevent unauthorized password resets. The technique requires no specialized knowledge of server 14 software or hardware and may be implemented by a relatively unsophisticated user, which is especially useful in an installation where the server 14 is installed as an information appliance in an office lacking internal computer support personnel.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention.

Accordingly, the protection sought herein is as set forth in the claims below.

What is claimed is:

1. A method performed by a first computer, comprising:
   receiving a remote reset signal;
   receiving a local reset verification signal;
   determining an elapsed period of time between receipt of the remote reset signal and the local reset verification signal; and
   resetting a password in response to the elapsed period of time being less than a predetermined time period;
   wherein the remote reset signal is activated by a user at a second computer and the local reset verification signal is activated by the same user or a different user at the first computer.

2. The method of claim 1, further comprising storing a remote reset receipt time on the computer system in response to receiving the remote reset signal.

3. The method of claim 2, wherein determining the elapsed period of time includes:
   determining a local reset verification time; and
   comparing the remote reset receipt time to the local reset verification time.

4. The method of claim 1, wherein the first computer comprises a headless server and the second computer comprises a client computer coupled to the first computer.

5. The method of claim 1, wherein receiving the remote reset signal includes receiving the remote reset signal through an external internet connection with the second computer.

6. The method of claim 1, wherein receiving the remote reset signal includes receiving an email message.

7. The method of claim 1, wherein receiving the local reset verification signal includes a user activating a physical reset of the first computer.

8. The method of claim 1, wherein receiving the local reset verification signal includes a user activating a local switch on the first computer.

9. The method of claim 1, wherein resetting the password includes resetting the password in response to the elapsed period of time being less than about 10 minutes.

10. A computer system comprising:
    a processor; and
    a program storage device encoded with instructions that, when executed by the processor, perform a method for resetting a password, the method comprising:
    receiving a remote reset signal;
    receiving a local reset verification signal;
    determining an elapsed period of time between receipt of the remote reset signal and the local reset verification signal; and
    resetting the password in response to the elapsed period of time being less than a predetermined time period;
    wherein the remote reset signal is activated by a user at a separate computer system and the local reset verification signal is activated at an input device that is associated only with the computer system.

11. The computer system of claim 10, the method further comprising storing a remote reset receipt time on the computer system in response to receiving the remote reset signal.

12. The computer system of claim 11 wherein determining the elapsed period of time in the method includes:
    determining a local reset verification time; and
    comparing the remote reset receipt time to the local reset verification time.

13. The computer system of claim 10, wherein the computer system comprises a headless server and the separate computer system comprises a client computer coupled to the computer system.

14. The computer system of claim 10, wherein receiving the remote reset signal in the method includes receiving the remote reset signal through an external internet connection of the computer system.

15. The computer system of claim 10, wherein receiving the remote reset signal in the method includes receiving an e-mail message.

16. The computer system of claim 10, wherein receiving the local reset verification signal comprises a user activating a physical reset of the computer system.

17. The computer system of claim 10, wherein receiving the local reset verification signal comprises activating a local switch on the computer system.

18. The computer system of claim 10, wherein resetting the password in the method includes resetting the password in response to the elapsed period of time being less than about 10 minutes.

19. A computer system, comprising:
    means for receiving a remote reset signal;
    means for receiving a local reset verification signal dependent upon a user moving from a first computer location to a second computer location;
    means for determining an elapsed period of time between receipt of the remote reset signal and the local reset verification signal; and
    means for resetting the password in response to the elapsed period of time being less than a predetermined time period.

20. A method for resetting a password in a server, comprising:
    receiving a first password reset signal from a client computer;
    generating a local reset verification signal if a user activates an input device associated only with the server;
    resetting the password if the local reset verification signal is received within a predetermined amount of time following the receipt of the first password reset signal by the server.

21. The method of claim 20, wherein said local reset verification signal is generated by a user-activated input device associated only with the server and connected to the server.

22. The method of claim 20, wherein said resetting the password comprises storing a new password received from a user-operated input device.

23. The computer system of claim 19 wherein said predetermined time period is adjustable by an administrator.

24. The computer system of claim 19 wherein the local reset verification signal is generated by physically resetting the computer system.

25. The computer system of claim 19 wherein the local reset verification signal is generated by physically activating a switch located on the computer system.

* * * * *